United States Patent
Tarrago et al.

(10) Patent No.: US 8,977,846 B2
(45) Date of Patent: Mar. 10, 2015

(54) METHOD AND DEVICE FOR THE SECURE TRANSFER OF DATA

(75) Inventors: Arnaud Tarrago, Paris (FR); Pascal Sitbon, Chatillon (FR); Pierre Nguyen, Montrouge (FR)

(73) Assignee: Electricite de France, Paris (FR)

( * ) Notice: Subject to any disclaimer, the term of this patent is extended or adjusted under 35 U.S.C. 154(b) by 0 days.

(21) Appl. No.: 13/878,117

(22) PCT Filed: Oct. 7, 2011

(86) PCT No.: PCT/FR2011/052344
§ 371 (c)(1),
(2), (4) Date: Apr. 5, 2013

(87) PCT Pub. No.: WO2012/045984
PCT Pub. Date: Apr. 12, 2012

(65) Prior Publication Data
US 2013/0212698 A1 Aug. 15, 2013

(30) Foreign Application Priority Data

Oct. 7, 2010 (FR) ...................................... 10 58134

(51) Int. Cl.
*H04L 29/06* (2006.01)
*G06F 21/00* (2013.01)
(Continued)

(52) U.S. Cl.
CPC .......... *G06F 21/606* (2013.01); *H04L 63/0209* (2013.01); *H04L 63/0245* (2013.01); *H04L 67/06* (2013.01); *H04L 63/145* (2013.01)
USPC .......................................... 713/161; 713/153

(58) Field of Classification Search
CPC ... H04L 63/123; H04L 63/0281; H04L 63/02; H04L 63/0471; H04L 63/0245; H04L 63/12; H04L 9/3244; G06F 21/50; G06F 21/60
See application file for complete search history.

(56) References Cited

U.S. PATENT DOCUMENTS 5,878,231 A 3/1999 Baehr et al.
8,607,066 B1 * 12/2013 Kailash et al. ................ 713/188
(Continued)

FOREIGN PATENT DOCUMENTS

| FR | 2 940 566 A1 | 6/2010 |
| JP | 09-224053 A | 8/1997 |
| JP | 2005-222207 A | 8/2005 |

(Continued)

OTHER PUBLICATIONS

English Translation of Office Action issued for JP 2013-532254 (May 13, 2014).

*Primary Examiner* — Izunna Okeke
(74) *Attorney, Agent, or Firm* — Drinker Biddle & Reath LLP

(57) ABSTRACT

A method for the secure transfer of a digital file from a first computerized system to one second computerized system, the method comprising the following steps: writing the digital file on a first file-management module of a secure transfer device, transferring the digital file to an internal verification module of the secure transfer device, verifying one portion of the transferred digital file in the verification module, and transferring the partially verified digital file to a second file-management module of the secure transfer device according to the result of the verification, in order to allow the file to be read by the one second computerized system according to the result of the verification.

8 Claims, 8 Drawing Sheets

(51) Int. Cl.
　　*G06F 21/60*　　　(2013.01)
　　*H04L 29/08*　　　(2006.01)

(56) References Cited

U.S. PATENT DOCUMENTS

2009/0241188 A1　9/2009　Komura

2012/0278894 A1　11/2012　Scales

FOREIGN PATENT DOCUMENTS

| JP | 2008-546111 A | 12/2008 |
| JP | 2009-232110 A | 10/2009 |
| WO | WO 97/12321 A1 | 4/1997 |
| WO | WO 2010/076514 A1 | 7/2010 |

\* cited by examiner

METHOD AND DEVICE FOR THE SECURE TRANSFER OF DATA

CROSS-REFERENCE TO RELATED APPLICATIONS

This application is the U.S. national phase of the International Patent Application No. PCT/FR2011/052344 filed Oct. 7, 2011, which claims the benefit of French Application No. 10 58134 filed Oct. 7, 2010, the entire content of which is incorporated herein by reference.

FIELD

The invention relates to the field of the secure transmission of data, in particular in computerized systems requiring a high level of security.

BACKGROUND

The protection of data networks is currently ensured by devices whose security relies on their dependability of implementation and the good mastery of the communication protocols. This is the case notably for "firewall" devices, application relays or network segmenting products (such as VLAN products, or those of the 802.1Q standard), as well as intrusion detection and prevention systems.

Several types of security architectures can exist. In very secure architectures, network interconnections are prohibited. Exchanges are made with the aid of physical elements which are attached to only one system at a time. Exchange devices with a single direction of communication exist but their reliability is limited on account of the lack of exchange control stream, and they are not necessarily used in the direction going from the least sensitive system in terms of security to the most sensitive system in terms of security. This is the case for "physical diode" devices based, for the most part, on optical fiber technologies.

It is customary to implement an "ideal" exchange architecture by way of successive firewalls delimiting an external exchange area, an internal exchange area of first level of confidentiality and an internal exchange area of second level of confidentiality, respectively managed by dedicated servers. By multiplying these exchange areas, the task of any ill-intentioned third party wishing to access, or indeed corrupt, certain data of a computerized system is made more complex.

However, numerous software flaws have been revealed in architectures of this type, thus giving rise to the compromising of the network that they were supposed to protect. The "ideal" exchange architectures have, for example, been sensitive to attacks on applications using Web technologies.

Independently of this problem of software dependability, poor application of the security policy of an enterprise or an error in the configuration of such devices can compromise the security of the entire network. These errors therefore require monitoring and procedures for continuous auditing and upgrading of such devices.

A first solution to these problems has been proposed in French patent application FR 08 58790. In this patent application, the invention consists in transferring data in a secure manner, by means of simple commands of read or write type, by way of physically frozen means as well as of an intermediate central storage space, so as to avoid seizure of control of a system connected to one of the access ports of the secure transfer system by means of a system connected to another of the access ports of this same secure transfer system.

However, a device using such a solution presents the drawback of depending on the systems which are connected to it as regards the end of the writing of a file. If such a device begins several file writes in parallel, this device is then compelled to maintain as many description tables as there are files in the course of writing, this being manifested by a needless consumption of resources.

Moreover, in a default implementation of a device according to this invention, the central storage element of such a device does not necessarily know when the digital file transferred has finished being transmitted, and this may impede the movement of this file in this element short of resorting to a particular implementation of this system, thereby complicating this solution still further.

There therefore exists, in the solutions of the prior art, a problem of managing files to be transferred, which ought to be remedied.

The present invention improves this situation.

SUMMARY

It proposes for this purpose a method of secure transfer of a digital file originating from a first computerized system to at least one second computerized system, this method comprising the writing of the digital file on a first file management module of a secure transfer device, the transfer of this digital file to a verification module internal to the secure transfer device, the verification of at least one part of the digital file transferred into this verification module and the transfer of the at least partially verified digital file to a second file management module of the secure transfer device as a function of the result of this verification, so as to allow the reading of the complete file by the second computerized system as a function of the result of this verification.

Advantageously, the method comprises a step of formatting the digital file written on the first file management module comprising the division of this digital file into a plurality of data packets of smaller size than a maximum size of data packets allowing transfer to the verification module, the verification then pertaining to at least one of said data packets. It is thus possible to perform packet-based verification adapted as a function of the physical constraints of the transfer device.

In an advantageous embodiment where the verification module comprises a first verification sub-module, the transfer step then comprises the transfer of at least one of the data packets to the first verification sub-module and the verification step comprises a first individual verification pertaining to each of the packets transferred into the first verification sub-module, thereby making it possible to verify the data to be transferred at a first level of detail.

In another advantageous embodiment in which the verification module furthermore comprises a second verification sub-module, the verification step furthermore comprises the transfer of at least one of the data packets verified individually in the first verification sub-module to the second verification sub-module and a second verification pertaining to at least one of the data packets transferred into the second verification sub-module, thereby making it possible to apply two successive levels of verification on the data to be transferred so as to strengthen the securing of the transfer.

In an advantageous embodiment where all the data packets verified individually in the first verification sub-module are transferred to the second verification sub-module, the second verification is an intermediate verification pertaining to a plurality of data packets from among the data packets transferred into the second verification sub-module, thereby making it possible to apply two different levels of verification to the data to be transferred so as to make the transfer more secure.

Still in an advantageous embodiment where all the data packets verified individually in the first verification sub-module are transferred to the second verification sub-module, the second verification is a global verification pertaining to all the data packets transferred into the second verification sub-module, thereby making it possible to combine a packet-based individual verification with a global verification pertaining to the whole of the file to be transmitted so as to make the transfer of this file more secure.

Advantageously, if the result of the individual verification of one of the packets received by the first verification sub-module and/or of the global verification in the second verification sub-module is negative, the transfer of the data packets is interrupted, thereby making it possible to prevent any transfer of potentially detrimental data to the second computerized system.

Alternatively, if the result of the individual verification of one of the packets received by the first verification sub-module is negative, the data packet whose verification gives a negative result is replaced with a substitution data packet, thereby making it possible not to interrupt the transfer of the data to the second computerized system while indicating the potentially detrimental data detected.

The present invention furthermore proposes a device for secure transfer of data, able to be connected to a first computerized system and a second computerized system, comprising a first file management module able to store a digital file received from the first computerized system, a verification module devised so as to receive the digital file stored on the first file management module and to perform a verification on at least one part of the digital file received and a second file management module able to receive the digital file from the verification module, so as to allow the reading of the digital file by the second computerized system as a function of the result of said verification.

Advantageously, when the first file management module is connected to the verification module by way of a physical interface, the first file management module is devised so as to divide the digital file into a plurality of data packets of smaller size than a maximum size of data that can be transferred to said physical interface, and the verification module is devised so as to perform a verification on at least one of said verification data packets, the verification then pertaining to at least one of said data packets, thereby making it possible to perform a packet-based verification adapted as a function of the physical constraints of the transfer device.

In an advantageous embodiment, the verification module comprises a first verification sub-module devised so as to receive at least one of the data packets obtained in the first file management module and to perform a first individual verification pertaining to each of the data packets received, thereby making it possible to verify the data to be transferred at a first level of detail.

In a particularly advantageous manner, the first verification sub-module is devised so as to transmit at least one individually verified data packet to the second file management module as a function of the result of the first individual verification pertaining to said at least one data packet, and the second file management module is designed to reconstruct the digital file on the basis of the verified data packets received from the first verification sub-module, thereby allowing the reading of the digital file reconstructed by the second computerized system as a function of the result of the individual verification of the data packets transferred.

In an advantageous embodiment, the verification module furthermore comprises a second verification sub-module able to receive at least one of the data packets verified individually in the first verification sub-module and devised so as to perform a second verification pertaining to at least one of the given packets received from the first verification sub-module, thereby making it possible to offer a double level of verification so as to strengthen the securing of the data transfer.

In another advantageous embodiment where the second verification sub-module is able to receive all the data packets verified individually in the first verification sub-module, the second verification can be an intermediate verification pertaining to a plurality of data packets from among the data packets received from the first verification sub-module, thereby making it possible to apply two different levels of verification to the data to be transferred so as to make the transfer more secure.

In this same particularly advantageous embodiment where the second verification sub-module is able to receive all the data packets verified individually in the first verification sub-module, the second verification can be a global verification pertaining to all the data packets received from the first verification sub-module, thereby making it possible to combine a packet-based individual verification with a global verification pertaining to the whole of the file to be transmitted so as to make the transfer of this file more secure.

BRIEF DESCRIPTION OF THE DRAWINGS

The method and the device for secure transfer, which are the subject of the invention, will be better understood on reading the description and observing the drawings hereinafter in which.

DETAILED DESCRIPTION

Figure 1:
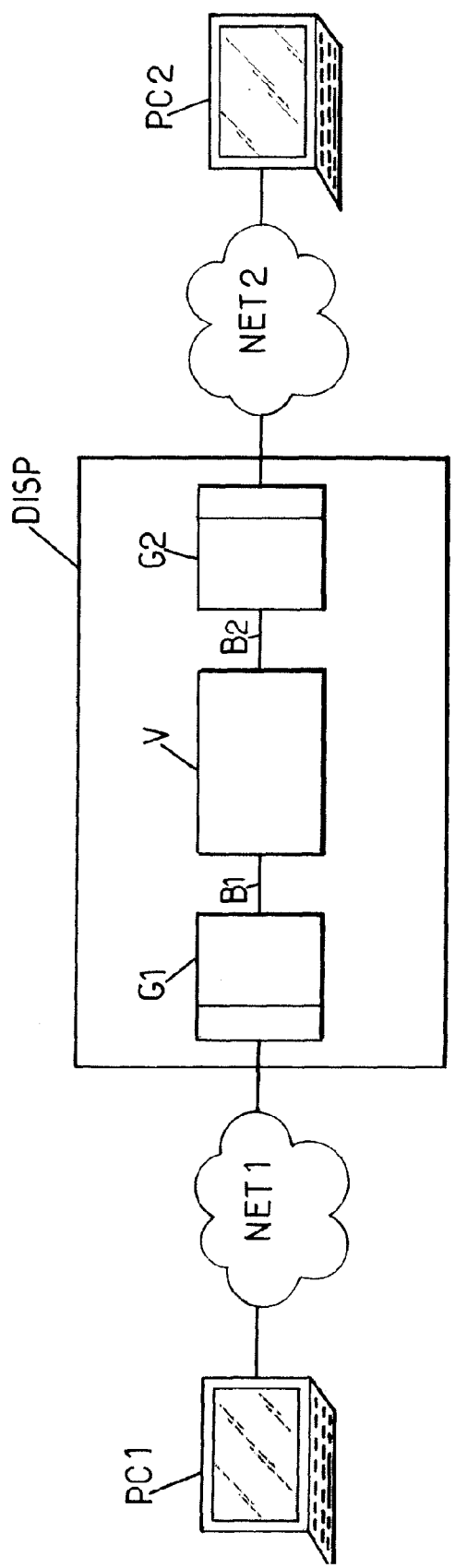
FIG. 1 is a schematic diagram illustrating a device for secure transfer of data according to the principle of the present invention.

Reference is first made to FIG. 1 in which the secure transfer device DISP according to the principle of the present invention is schematically illustrated.

The secure transfer device DISP is connected, on the one hand, to a first computerized system PC1 by way of a first network NET1 and, on the other hand, to a second computerized system PC2 by way of a second network NET2, so as to allow the secure exchange of data between these two computerized systems.

Here, the term computerized system is intended to mean any type of computing system able to read or write a digital file by way of a network interface, such as for example a personal computer, a server, a smartphone, an industrial automaton, a sensor, an actuator or any other communicating object.

Likewise, here the term network is intended to mean any type of architecture making it possible to physically interconnect computerized systems, such as for example a local network of Ethernet type, a wireless network, the Internet network or any other type of physical attachment.

The secure transfer device DISP firstly comprises a first file management module G1 able to store a digital file F received from the first computerized system PC1.

Accordingly, the first file management module G1 comprises a storage means allowing the storage of the digital file F deposited on the basis of the first computerized system PC1. Such a storage means can consist for example of a hard disk or a flash memory.

The first file management module G1 moreover comprises a network interface, connected to the first network NET1 linked to the first computerized system PC1, which allows remote connection with this first computerized system PC1 so as to receive therefrom the digital file F. Such a network interface can be of FTP or HTTP type, for example.

The first file management module G1 furthermore comprises a processing module making it possible to manage the way in which the digital files are deposited and organized on the storage means. Thus, in particular, the processing means manages the queue of the files to be transferred and shapes these files, for example by associating a marking with them and by dividing them into a plurality of data packets, before transmitting them in a sequential manner to the secure transfer device verification module.

By virtue of this first file management module G1, the parallel transmission of digital files can be controlled so as to avoid needless consumption of resources.

Such a marking can correspond to the conversion of the digital file into a specific format internal to the device, for example with a header indicating the size and the type of file.

The processing module can also manage the files stored in the first module G1 by means of a directory and classify them as a function of a parameter such as the date of depositing of the file on the first module G1 or a predetermined order of priority.

The secure transfer device DISP moreover comprises a verification module V devised so as to receive the digital file F stored on the first file management module G1 and to perform a verification on at least one part of the digital file received.

This verification, and the possible modification of the type involving substitution or deletion of certain digital data which may accompany it, may pertain to the whole of the digital file F or, if this is divided into a plurality of packets $F_i$ at the level of the first file management module G1, to one or more of these packets transmitted sequentially from the first file management module G1 to the verification module V, as a function of the type of verification employed. In particular, this verification may be done on the fly, in real time, on individual packets $F_i$, on lines of the digital file F that are reconstructed on the basis of various packets $F_i$, or else on the digital file F reconstructed on the basis of all the packets $F_i$.

In the course of this verification, diverse parameters may be verified such as, for example, the size of the packets $F_i$ transferred or the syntax employed in these packets, the type of characters used in these packets or the electronic signature affixed to the digital file F.

In order to limit to the maximum the possibilities of seizure of control of this verification module V by an exterior element, it is advantageous to physically freeze the verification functionalities of the verification module, for example by implementing this module in the form of an FPGA (for Field Programmable Gate Array) that can be programmed by software before being physically frozen.

When the verification pertains to sets of individual packets $F_i$, for example corresponding to lines of the digital file F, or else pertains to the digital file F in full, the verification module V also advantageously comprises a buffer memory, for example of RAM type, making it possible to temporarily store the packets $F_i$ received so as to reform the line of the digital file to be analyzed, or indeed the entire digital file F to be analyzed. The size of this buffer memory depends on the fineness of the verification to be performed.

The secure transfer device DISP also comprises a second file management module G2 able to receive the digital file from the verification module, so as to allow its reading by the second computerized system PC2 as a function of the result of the verification performed in the verification module V.

This second file management module G2 is similar to the first file management module G1 and comprises a storage means allowing the storage of the digital file F, in its complete form or in a form deconstructed into packets $F_i$, once it has been verified by the verification module V, a network interface allowing connection to the network NET2 linked to the second computerized system PC2.

The second file management module G2 can furthermore comprise a processing module making it possible to manage the way in which the digital files are deposited and organized on the means for storage of the second management module G2, and for making read-available in respect of the second computerized system PC2.

For example, if the digital file F is deconstructed in the first management module G1 into a plurality of data packets $F_i$, which are thereafter verified individually and sequentially by the verification module V, or indeed possibly modified by substitution or deletion of certain digital data belonging to some of the data packets $F_i$, before arriving sequentially in the second management module G2, this processing module will be able to reconstruct a digital file F' on the means for storage of the second management module G2, by bundling the verified packets $F_i$, possibly modified by substitution or deletion of a part of their digital data, before giving the second computerized system PC2 read-access to this reconstructed file.

It is thus possible to check when the transferred file F is made available to the second computerized system PC2, for example by rendering it accessible only when the file F is completely reconstructed in the file management module G2, thereby making it possible to tackle the drawbacks apparent in the prior art.

The modules for managing files G1 and G2 are respectively connected to the verification module V of the secure transfer device DISP by way of physical interfaces B1 and B2, of memory bus type, having a limited size.

In such a case, it is advantageous to divide the digital file F to be transmitted into a plurality of packets $F_i$ whose size is smaller than a maximum size of data packets that can travel over the physical interface B1, determined as a function of the limited size of the physical interface B1. Thus, it is for example possible to form packets $F_i$ of 256 bytes.

Figure 2:
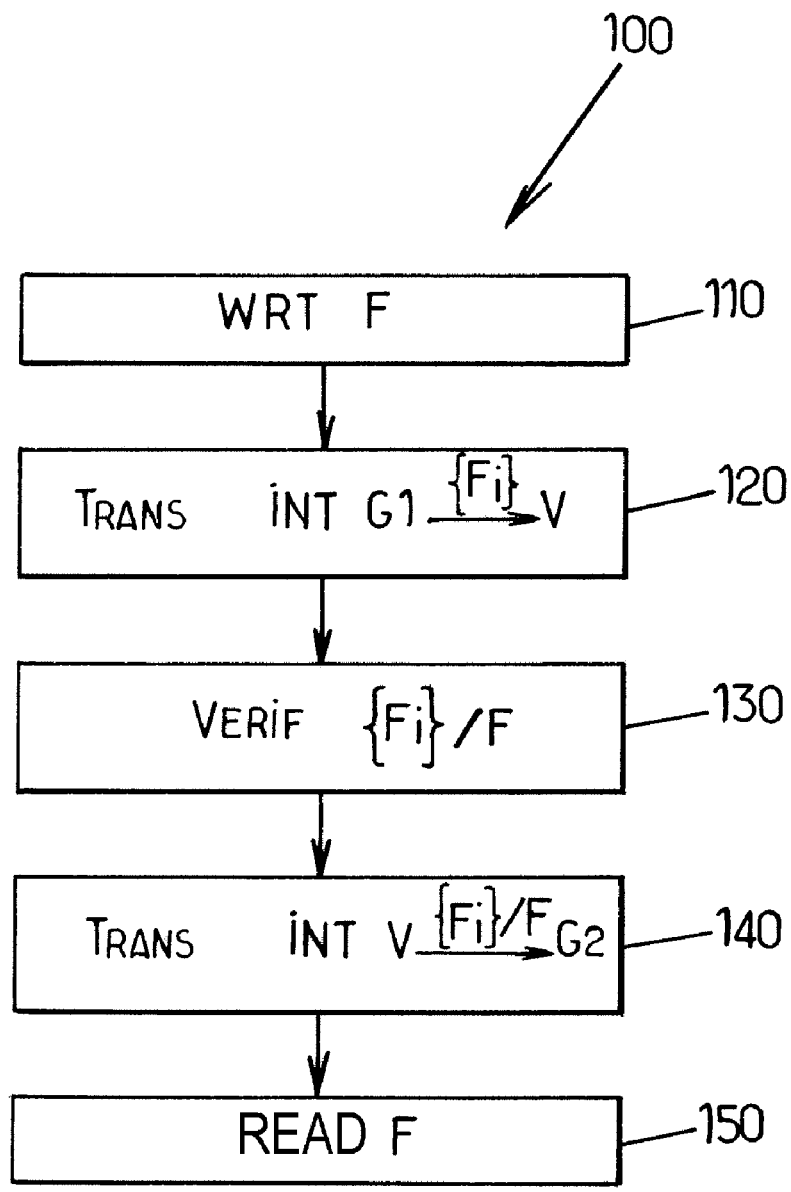
FIG. 2 illustrates the steps of a method of secure transfer of data according to the principle of the present invention.

Reference is now made to FIG. 2 which illustrates a method 100 of secure transfer of a digital file F originating from a first computerized system PC1 to at least one second computerized system PC2 according to the principle of the invention.

The method 100 firstly comprises a step 110 of writing the digital file F to a first file management module G1 of a secure transfer device DISP, such as for example that described in FIG. 1.

Subsequent to the depositing of this digital file F on this first file management module G1, the method 100 continues through the transfer (step 120) of this digital file F to a verification module V internal to the secure transfer device DISP. This transfer can be done in one chunk, or by way of the sequential transfer of a plurality of packets $F_i$ obtained by deconstruction of the digital file F in the first file management module G1, according to the type of verification performed, as will be described in greater detail subsequently.

The method 100 then comprises a step 130 of verifying at least one part of the digital file F transferred in the verification module.

Thus, when the digital file F is transferred in the form of a sequential transfer of a plurality of packets $F_i$ obtained by deconstruction of the digital file F in the first file management module G1, the verification can be of "individual" type, that is to say performed individually on one of the packets $F_i$ transferred, on several of the packets $F_i$ transferred, or indeed sequentially on the whole set of packets $F_i$ transferred.

In another example where the digital file F is transferred in one chunk to the verification module, the verification can be of "global" type, that is to say performed on the whole of the digital file F.

The method 100 then continues through the transfer (step 140) of the at least partially verified, or indeed completely verified, digital file F to a second file management module G2 of the secure transfer device DISP as a function of the result of the verification performed in the verification module V, doing this so as to allow the reading of the file F by the second computerized system PC2 as a function of the result of this verification.

The transfer step 140 can pertain to the complete digital file, or be done by transmission of packets $F_i$ as a function of the size of the physical bus linking the verification module to the second management module G2.

Thus, if all the verification operations performed during the verification step 130 have a positive result, the digital file F is to be found stored in the second file management module G2 and read-available in respect of the second computerized system PC2.

Conversely, if one or more of the verification operations performed during the verification step 130 have a negative result, the transfer of the digital file F can be interrupted before it is fully available on the second management module PC2, so as to prevent this digital file F from being made available to the second computerized system PC2 if it does not meet the verification criteria, so as to protect the second computerized system PC2 from any potentially dangerous or unexpected information.

In an alternative manner, again if one or more of the verification operations performed during the verification step 130 have a negative result, it is also possible to substitute for the part of the digital file F that caused this negative result (for example for a packet $F_i$) substitution data exhibiting a very precise form known to the second computerized system PC2, such as for example "_" characters or any other marker, composed of specific characters fixed beforehand, that can indicate various discrepancies with respect to the verification criteria.

In this case, the digital file F will actually be available, in a modified form F' so as to indicate that it no longer presents a risk, on the second management module G2, but when it is subsequently read by the second computerized system PC2, this will recognize that the file F has been modified into a file F' and does not meet the verification criteria. Advantageously, it may even detect the type of discrepancy noted and therefore which verification criterion is not complied with by the original file F. The computerized system PC2 deduces therefrom that the original file F did not exhibit all the guarantees in terms of security by detecting the presence of the substitution data.

Thus, with the method 100 of secure transfer of data, the second computerized system PC2 always has access to the digital file F in its entirety if the verification of this digital file worked well, and if this verification has detected a problem, the second computerized system PC2 does not have access to any digital file or else to a modified digital file F' at least one part of which has been substituted in a known manner.

In all these possible typical cases, the second computerized system PC2 will not have to manage a multitude of packets transferred sequentially directly after their verification, thereby representing a noticeable improvement with respect to the prior art mentioned above.

Figure 3A:
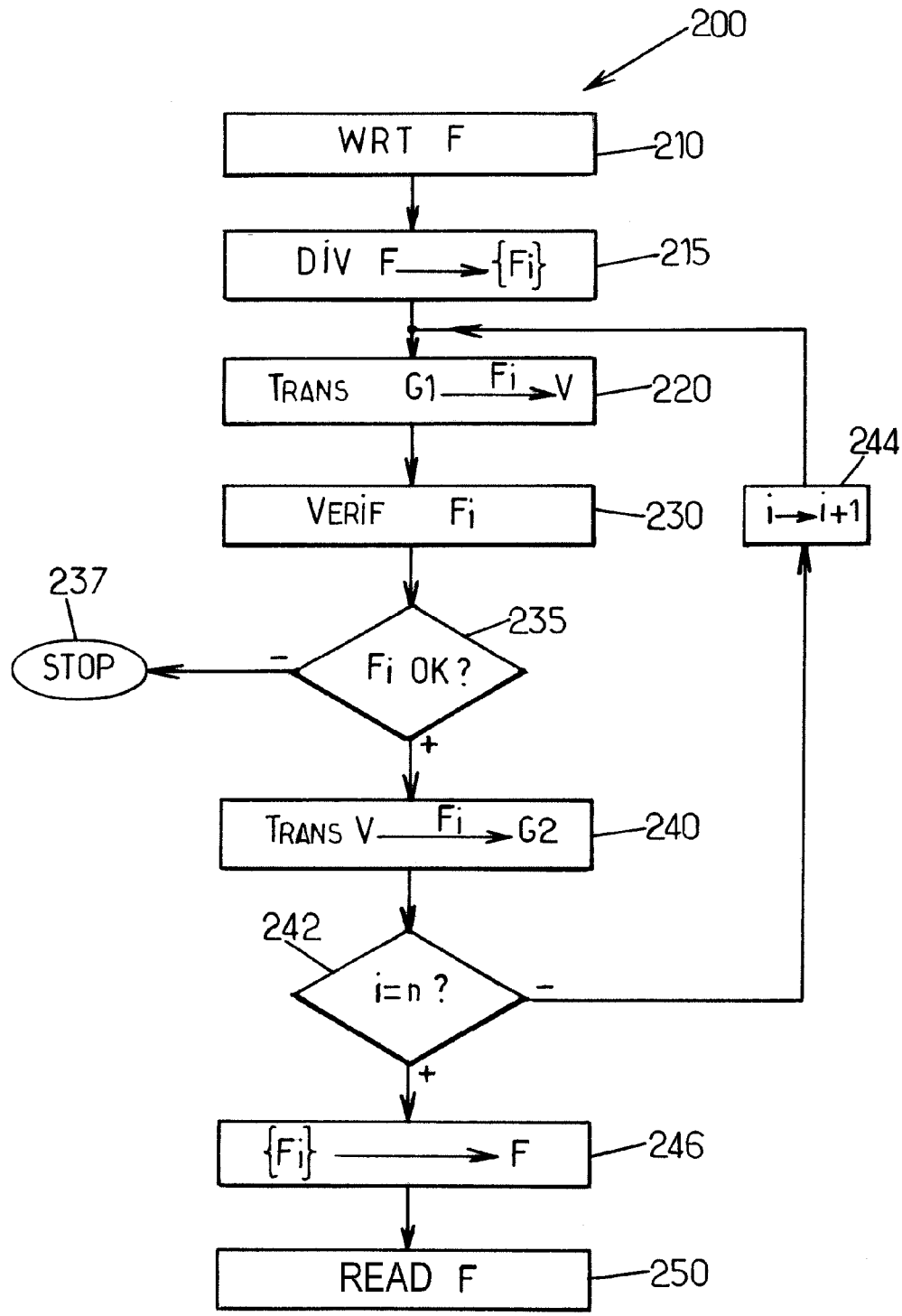
FIG. 3A illustrates the steps of a method of secure transfer of data according to a first embodiment of the present invention.

Reference is now made to FIG. 3A which illustrates a method 200 of secure transfer of a digital file F according to a first embodiment of the invention.

In this first embodiment, the verification is termed of "first level" or "individual" type, since it is performed on each of the packets $F_i$ of a set of n data packets $\{F_i\}_{1 \leq i \leq n}$ corresponding to the deconstruction of the digital file F to be transferred.

The method 200 therefore comprises a first step 210 of writing the digital file F to a first file management module G1 of a secure transfer device DISP, similarly to step 110 described hereinabove.

Subsequent to the depositing of this digital file F on this first file management module G1, the method 200 comprises a step 215 of deconstructing this digital file F into a set of n data packets $\{F_i\}_{1 \leq i \leq n}$, so as to be able to perform a verification pertaining to at least one of these data packets. These packets $F_i$ have a smaller size than a maximum size of given packets allowing the transfer to the verification module, for example as a function of the size of the physical interface allowing this transfer.

Some of these packets may contain meta-information intended for the following module (for example the size of the file, its name, its extension, its serial number, etc.), with or without part of the original file, as may be the case when a marker for the start and/or end of file containing this meta-information is used.

A first packet $F_1$ is thereafter transferred (step 220) to a verification module V internal to the secure transfer device DISP, so that the latter undertakes a verification of "first level" on this packet $F_1$, otherwise called "individual" verification insofar as it is performed on a single packet.

This verification can consist, for example, in verifying that all the characters of the analyzed packet $F_1$ belong to a limited alphabet of possible characters. The presence of a single character not belonging to this alphabet then gives rise to a negative result for this verification.

In this first embodiment, if the result of the verification is negative (step 235), then the packet $F_1$ is not transferred any further in the secure transfer device DISP (step 237), thereby interrupting the transfer of the digital file F.

If on the other hand the result of the verification is positive (step 235), then the packet $F_1$ is transferred to a second file management module G2 of the secure transfer device DISP, accessible to the second computerized system PC2.

Thus, as long as the result of the verification is positive, steps 220 to 240 are thereafter repeated sequentially for each packet $F_i$ until the last packet $F_n$, as indicated by the incrementation loop (steps 242 and 244) represented in FIG. 3A. If, on the other hand, one of the packets $F_i$ gives a negative result in the course of the verification step 230, the transfer of the digital file F is interrupted at this juncture (step 237) and this digital file F does not become accessible to the second computerized system since it is not completely transferred to the second file management module G2. In such a case, a specific signal such as for example a meta-information item can be dispatched to the file management module G2 to indicate that the file F is invalid and that it should be ignored and/or deleted.

If, after n−1 iterations with positive verification result, the method reaches the last packet $F_n$, and if this last packet $F_n$ is also verified in a positive manner during step 230 which relates to it, the method 200 continues through a step 246 of reconstructing the digital file F in the file management module G2, for example by sequential concatenation of the files $F_i$ originating from the verification module, so that F=$F_1$II . . . II$F_i$II . . . II$F_n$.

In this case, each of the packets $F_i$ of the digital file F having been verified individually, the digital file F is verified packet-wise and can therefore be read, in the course of a last reading step 250, by the second computerized system PC2.

This method according to a first embodiment is advantageous when the second computerized system, to which it is desired to transfer the digital file F, has only a limited degree of autonomy and analysis of the files received, the filtering of the potentially detrimental files being done in the secure transfer device itself. In so far as, with the method according to a first embodiment, this second computerized system has access only to fully verified and validated digital files, it is not necessary to add decision elements and elements for filtering/deleting the potentially detrimental digital files in this second computerized system. The second computerized system can then perform more simplistic verifications or ones of another nature such as the verification of digital signatures, reverify the name of the files, verify the extensions, carry out "versioning" management, etc.

Figure 3B:
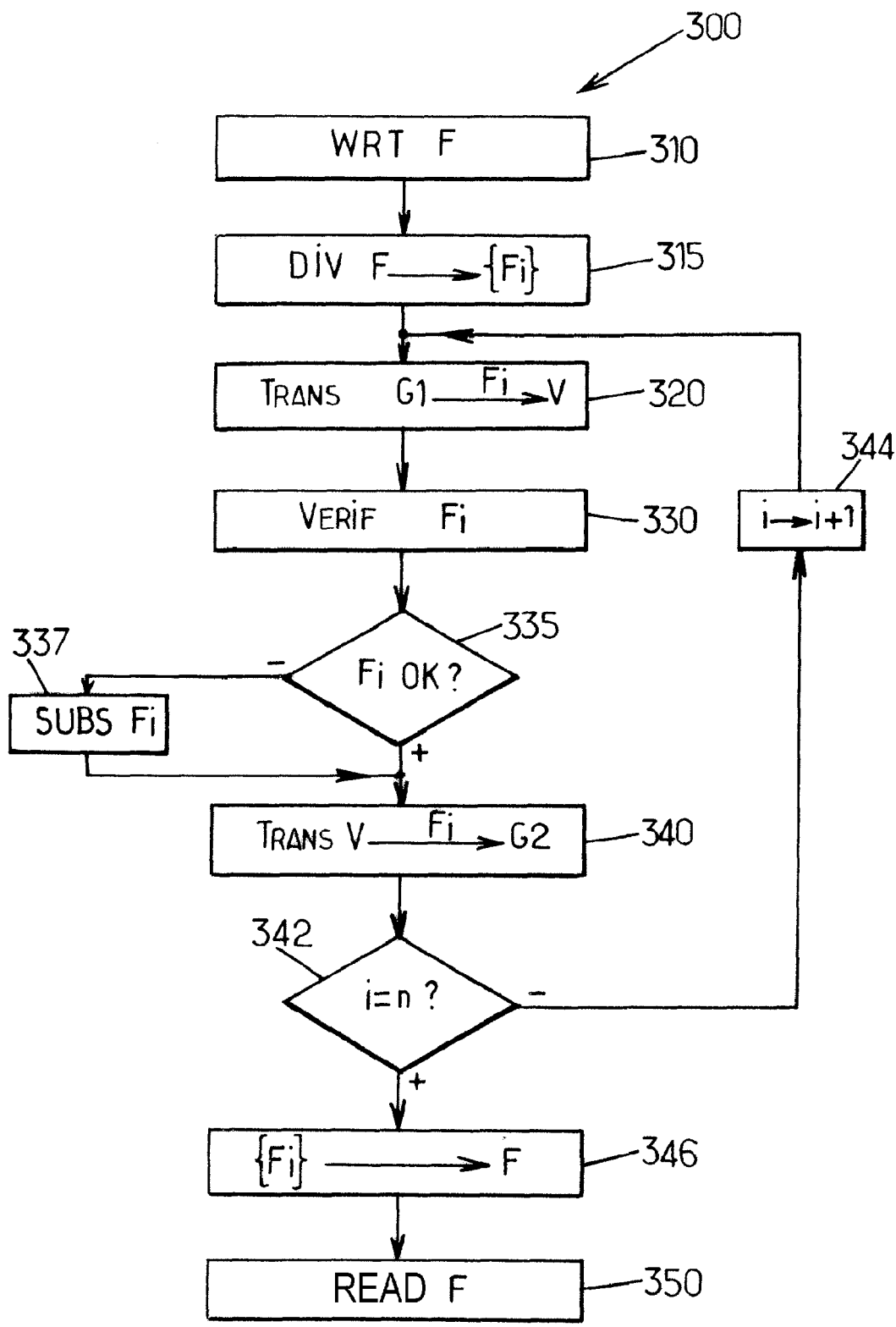
FIG. 3B illustrates the steps of a method of secure transfer of data according to a variant of the first embodiment of the present invention.

FIG. 3B which illustrates a method 300 of secure transfer of a digital file F according to a variant of the first embodiment of the invention is now referred to.

In this variant of the first embodiment, the method 300 comprises steps 310 to 350 respectively similar to steps 210 to 250 described hereinabove in conjunction with FIG. 3A, with the exception of step 337 applying in the case of a negative result of the individual verification of the sequentially transmitted data packets $F_i$.

In this variant, if step 330 of verifying a data packet $F_i$ gives a negative result, the packet $F_i$ in question is transformed through a substitution packet $F_i'$ by substituting some, or indeed all, of its characters by specific substitution characters, during a substitution step 337, before being transmitted (step 340) to the second management module G2 of a secure transfer device.

The substitution packet thus exhibits a form indicative of the negative result of the verification, that can be recognized as such by the second computerized system so that the latter can detect that a part at least of the digital file F' read on the second management module G2 exhibits a verification that gave a negative result.

For example, the substitution characters can take the form of a string of "_" characters.

Thus, in this variant, all the data packets $F_i$ are systematically transmitted, after verification and in sequence, to the second management module G2, in contradistinction to the embodiment illustrated previously in FIG. 3A in which the transfer of the data packets $F_i$ is interrupted as soon as one of these packets $F_i$ affords a negative result during its individual verification.

It follows from this variant that the digital file F can always be reconstructed in the second management module G2, since all its component packets $F_i$ are systematically transferred to this management module, and therefore that the digital file F' is available, after individual verification of each of its packets, for reading by the second computerized system PC2.

This variant of the method according to a first embodiment is advantageous when the computerized system to which it is desired to transfer the digital file has a certain degree of autonomy and analysis of the files received, and is itself capable of managing digital files whose elements that could represent a risk have been rendered inoffensive, by detecting them by virtue of the substitution data inserted by the method of the present invention and by optionally deleting them or by keeping an events journal in which the arrival of a potentially harmful digital file such as this is noted.

Figure 4A:
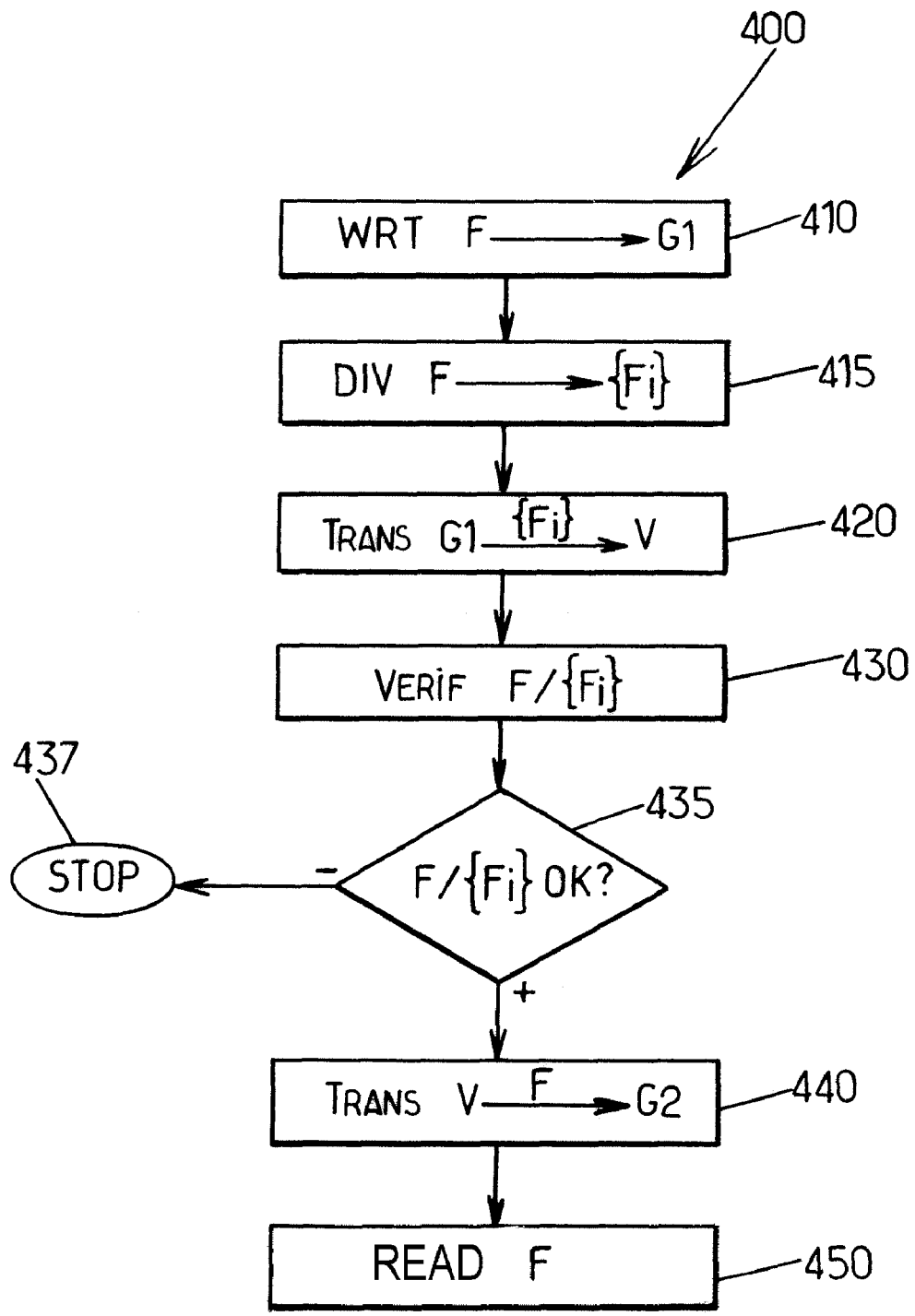
FIG. 4A illustrates the steps of a method of secure transfer of data according to a second embodiment of the present invention.

Reference is now made to FIG. 4A which illustrates a method 300 of secure transfer of a digital file F according to a second embodiment of the invention.

In this second embodiment, the verification is of "second level" type, to be distinguished from the first-level individual verification described in FIGS. 3A and 3B, insofar as this verification is performed on at least one part of the digital file F to be transferred corresponding to several data packets, or indeed the whole, of this digital file.

In this respect, the method 400 comprises a first step 410 of writing the digital file F to a first file management module G1 of a secure transfer device DISP, similarly to step 110 described hereinabove.

Subsequent to the depositing of this digital file F on this first file management module G1, the method 400 comprises a step 415 of deconstructing this digital file F into a set of n data packets $\{F_i\}_{1 \le i \le n}$, similar to step 215 hereinabove.

The n data packets $F_i$ are thereafter transferred (step 420) to a verification module V internal to the secure transfer device DISP, so as to perform a verification step 430 therein.

In contradistinction to the individual verification of the packets of the first embodiment described in FIGS. 3A and 3B, the verification of the second embodiment is performed on a set of data packets $F_i$ from among the packets transferred, or indeed on the entirety of the packets transferred, that is to say on the digital file reconstructed on the basis of the entirety of the packets transferred.

In particular, this second-level verification can be designated as being an "intermediate" verification if it pertains to a plurality of data packets from among the data packets transferred and this verification can be designated as being a so-called "global" verification if it pertains to all the data packets transferred in the second verification sub-module.

By way of example, such a second-level verification can then take the following forms:
  if a set of packets $F_i$ corresponding to a line of the digital file F are verified together, thus corresponding to an intermediate verification, it is possible to verify the presence of a specific character corresponding to a carriage return at the end of this set of packets or compliance with a specific line pattern. In the absence of a specific character such as this, or if the specific line pattern is not complied with, the result of this second-level verification is negative.
  if the whole of the digital file F is reconstructed so as to be analyzed fully, thus corresponding to a global verification, the verification can then consist in verifying the presence of a very specific signature. In the absence of a specific signature such as this, the result of this second-level verification is negative.

still if the whole of the digital file F is reconstructed so as to be analyzed fully (global verification of the file), the verification can pertain to the data format of the file so as to verify that this format does indeed correspond to a file type that can be transferred. Such a verification can be done by means of "magic numbers", by checking the header of the file F to verify a particular encoding type (for example the UTF8 encoding: BOM UTF-8) or by checking the first few characters of the file F which are indicative of the file type in certain cases (GIF, JPEG, etc.).

If the result of this second-level verification is negative (step 435), that is to say if the verified set of packets is not validated during the verification step, then the secure transfer method 400 is interrupted at this juncture (step 437) and the digital file F does not become accessible to the second computerized system since none of its data packets $F_i$ is transferred to the second file management module G2.

Conversely, if the result of this verification of "global" type is positive (step 435), that is to say if the verified set of packets is validated during the verification step, then the secure transfer method 400 continues through the transfer (step 440) of the digital file F to the second file management module G2 via a set of n data packets $\{F_i\}_{1 \leq i \leq n}$ corresponding to the deconstruction of the digital file F to be transferred.

Some of these packets $F_i$ may contain meta-information intended for the following module (for example the size of the file, its name, its extension, its serial number, etc.), with or without part of the original file, as may be the case when a marker of the start and/or end of file containing such meta-information is used for example.

In an advantageous embodiment, the verification module has means of temporary storage (for example of RAM type) allowing the storage of the packets $F_i$ received from the first management module G1 and verified in the verification module, as well as their bundling, after verification 430, so as to reform the digital file F at the level of the verification module V. In such a case, it is the digital file F itself which is transferred during the transfer step 440.

This last embodiment is advantageous insofar as it makes it possible to perform a verification of "global" type on the digital file F itself (such as for example the verification of a signature of the file) while performing a transfer of the digital file packet-wise, so as to take account for example of the capacity constraints of the physical interface situated between the first management module G1 and the validation module V, and symmetrically between V and G2.

Thus, in this embodiment, the digital file F is received as is and stored by the second management module G2, if it is validated during the verification step 430, so as to allow its reading by the second computerized system.

In another alternative where the verification module does not have any such means of temporary storage, the whole set of packets $F_i$ received from the first management module G1 are transferred to the second management module G2 during the transfer step 440, after the validation of at least a plurality of these packets, or indeed of the whole set of packets, during the verification step 430.

In this alternative, the data packets $F_i$ received by the second management module G2 are bundled by the latter so as to rebuild the digital file F and to place this file at the disposal of the second computerized system.

Figure 4B:
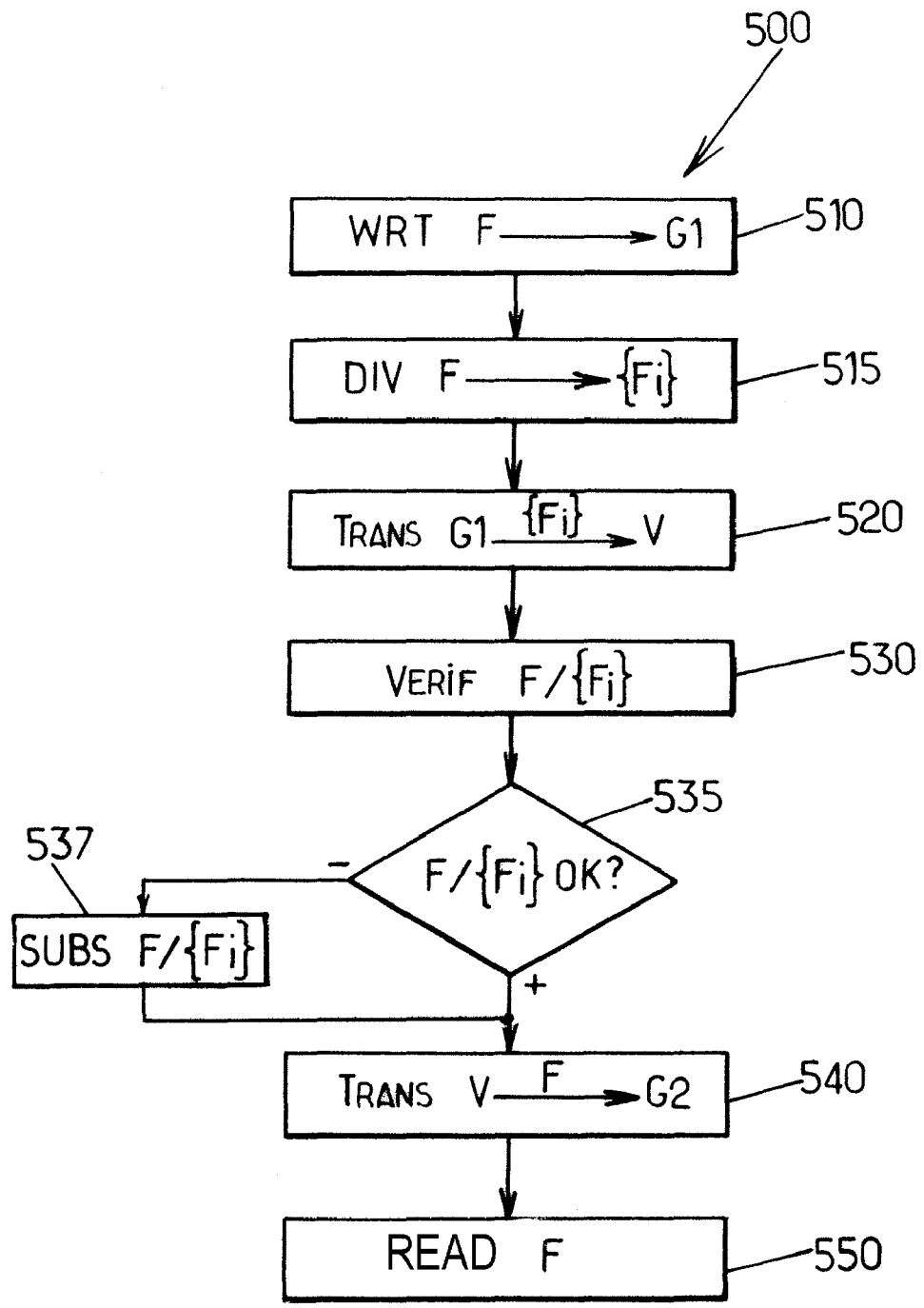
FIG. 4B illustrates the steps of a method of secure transfer of data according to a variant of the second embodiment of the present invention.

Reference is now made to FIG. 4B which illustrates a method 500 of secure transfer of a digital file F according to a variant of the second embodiment of the invention.

In a similar manner to what distinguishes the variant, described in FIG. 3B, of the first embodiment from the first embodiment described in FIG. 3A, the method 500 comprises steps 510 to 550 respectively similar to steps 410 to 450 described hereinabove in conjunction with FIG. 4A, with the exception of step 537 applying in the case of a negative result of the verification (step 530) of a set of packets from among the data packets $F_i$ transferred from the first management module G1 to the verification module.

In this variant, if step 530 of verifying a set of data packets $F_i$, or indeed of the whole of the digital file F, gives a negative result, the set of packets $F_i$ in question is replaced with substitution data, during a substitution step 537, before being transmitted (step 540) to the second management module G2 of a secure transfer device.

The substitution data exhibit a form indicative of the negative result of the verification and that can be recognized as such by the second computerized system, so that the latter can detect that the digital file F' read on the second management module G2 has not been validated during the verification process.

For example, the substitution data can take the form of "_" characters.

Thus, in this variant, the digital file F is systematically transmitted, after verification, to the second management module G2, in contradistinction to the embodiment illustrated previously in FIG. 4A in which the packet-wise transfer of the digital file F is interrupted as soon as the verification performed on a set of packets $F_i$, or on the digital file in its entirety, exhibits a negative result.

It follows from this variant that the digital file F' is always available, after at least partial verification of this digital file, for reading by the second computerized system PC2.

Just as for the variant illustrated in FIG. 3B, this variant of the method according to a second embodiment is advantageous when the second computerized system, to which it is desired to transfer the digital file, has a certain degree of autonomy and capabilities for analyzing the files received, and is itself capable of managing potentially harmful digital files, by detecting them by virtue of the substitution data.

Figure 5A:
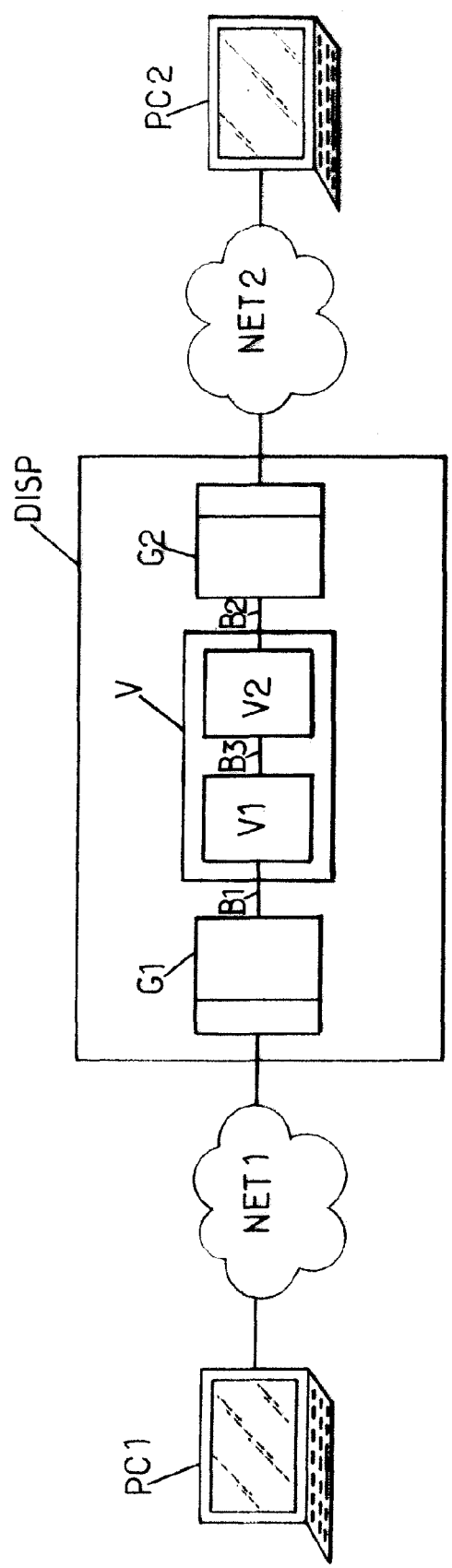
FIG. 5A is a schematic diagram illustrating a device for secure transfer of data according to another embodiment of the present invention.

Reference is now made to FIG. 5A in which a secure transfer device DISP' according to another embodiment of the present invention is schematically illustrated.

In this other embodiment, one seeks to offer a double level of verification during the secure transfer of a digital file in this device DISP'.

In this sense, the secure transfer device DISP' comprises a first file management module G1 and a second file management module G2 which are similar to those of the secure transfer device DISP described in FIG. 1.

Just like the secure transfer device DISP described in FIG. 1, the secure transfer device DISP' comprises a verification module V, which is distinguished, however, in that it comprises a first verification sub-module V1 and a second verification sub-module V2.

The first verification sub-module V1 is devised so as to receive at least one data packet obtained in the first file management module G1 and to perform a first individual verification pertaining to each of the data packets $F_i$ transferred from the first file management module G1, in the manner of what is described with regard to the secure transfer methods 200 and 300 illustrated in FIGS. 3A and 3B.

The second verification sub-module V2 is able to receive at least one data packet verified individually by the first verification sub-module, by way of a physical interface B3 of memory bus type, and is devised so as to perform a second verification pertaining to at least one of the data packets received from the first verification sub-module.

It is thus possible to offer a double level of verification making it possible to strengthen the securing of the data transfer.

In a first embodiment, the verification performed in the second verification sub-module V2 can be of the same level as that performed in the second verification sub-module V2, that is to say it can be of individual type and be performed packet by packet, but using different verification criteria from those employed during the first verification.

In another advantageous embodiment, the verification performed in the second verification sub-module V2 is done at a different, broader, level than that performed in the first verification sub-module V1, that is to say it pertains not to a single data packet, but to a set of data packets, thereby making it possible to detect a broader raft of potential defects in this digital file F.

In this other advantageous embodiment, the second verification sub-module V2 is then able to receive all the data packets verified by the first verification sub-module and is devised so as to perform a second verification (of second level) pertaining to several packets from among the transferred data packets $F_i$ received from the first verification sub-module V1, in the manner of what is described with regard to the secure transfer methods 400 and 500 illustrated in FIGS. 4A and 4B and that is designated here by intermediate verification. It is then possible to apply two different levels of verification to the data to be transferred so as to make the transfer more secure.

In another particularly advantageous embodiment where the second verification sub-module V2 is able to receive all the data packets verified by the first verification sub-module, the second verification sub-module V2 is devised so as to perform a second verification (of second level) pertaining to the set of data packets $F_i$ received from the first verification sub-module V1, still in the manner of what is described with regard to the secure transfer methods 400 and 500 illustrated in FIGS. 4A and 4B and that is designated here by global verification. It is thus possible to combine a packet-based individual verification with a global verification pertaining to the whole of the file to be transmitted so as to make the transfer of this file more secure.

In an advantageous embodiment, the second verification sub-module V2 has means of temporary storage (for example of RAM type) allowing the storage of the packets $F_i$ verified and received from the first verification sub-module V1, as well as their bundling to reform the digital file F at the level of the second verification sub-module V2, thereby making it possible to transfer the digital file F itself to the second file management module G2.

This embodiment is advantageous insofar as it makes it possible to perform a "global" verification on the digital file F itself (such as for example the verification of a signature on the whole of the digital file F) while performing a transfer of the digital file packet-wise between the first management module G1 and the second is verification sub-module V2, so as to take account for example of the capacity constraints of the physical interfaces B1 and B3 situated between these two elements.

Figure 5B:
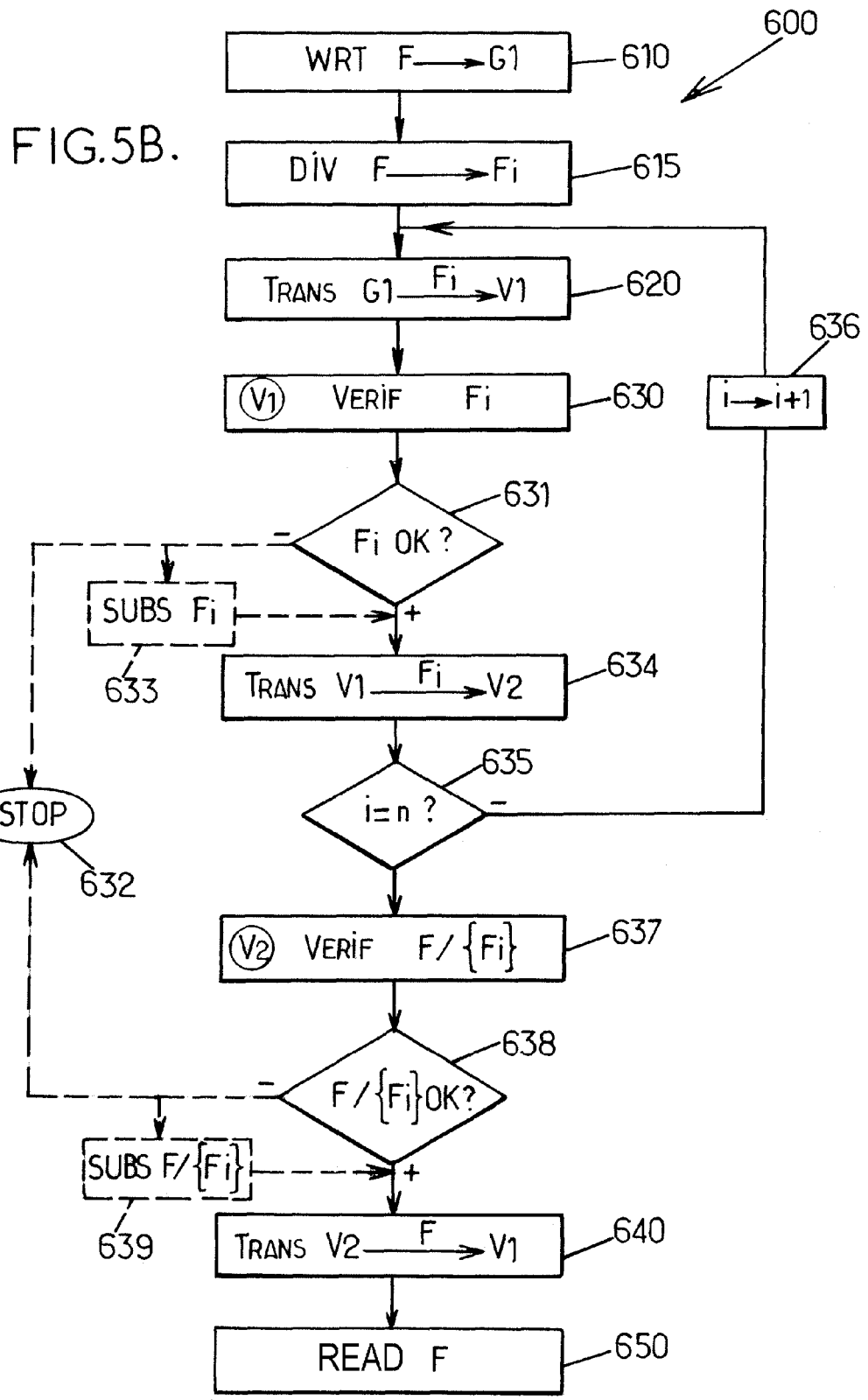
FIG. 5B illustrates the steps of a method of secure transfer of data according to a third embodiment of the present invention.

FIG. 5B illustrates a method 600 of secure transfer according to a third embodiment of the invention, which is applicable in particular to the secure transfer device DISP' described in FIG. 5A.

In this third embodiment, the advantages of the methods according to a first and a second embodiment such as described hereinabove in FIGS. 3A, 3B, 4A and 4B are combined.

The method 600 thus comprises a first step 610 of writing the digital file F to a first file management module G1 of a secure transfer device DISP' such as described in FIG. 5A, similarly to step 110 described hereinabove.

Subsequent to the depositing of this digital file F on this first file management module G1, the method 600 comprises a step 615 of deconstructing this digital file F into a set of n data packets $\{F_i\}_{1 \leq i \leq n}$.

A first packet $F_1$ is thereafter transferred (step 620) to the first verification sub-module V1 internal to the secure transfer device DISP', so that the latter undertakes a first individual verification, of first level, on this packet $F_1$ during the verification step 630.

Just as for the method 200 illustrated in FIG. 3A, this first individual verification can consist in verifying that all the characters of the packet $F_1$ belong to a determined alphabet.

If the result of the first verification is negative (step 631), two options are then possible, in a manner similar to the options described respectively in FIGS. 3A and 3B:

either the packet $F_1$ is not transferred further in the secure transfer device DISP' (step 632), thus preventing the transfer of the digital file F in this device, and the transfer method 600 is interrupted;

or the packet $F_1$ is replaced with a substitution packet $F_1'$ as described previously, during a substitution step 633, before being transmitted (step 634) to the second verification sub-module V2 of the secure transfer device DISP'.

If on the other hand the result of the first verification is positive (step 631), then the packet $F_1$ is transferred (step 634) to the second verification sub-module V2 of the secure transfer device DISP'.

As long as the result of the first packet-based individual verification is positive, steps 620 to 634 are thereafter repeated sequentially for each packet $F_i$ until the last packet $F_n$, as indicated by the incrementation loop (steps 635 and 636) represented in FIG. 5B.

If one of the packets $F_i$ gives a negative result in the course of the verification step 630, there is either interruption at this juncture (step 633) of the method 600 and the digital file F' does not become accessible to the second computerized system since it is not completely transferred to the second verification sub-module V2, or substitution (step 632) of the data packet $F_i$ incriminated with a substitution packet.

If, after n−1 iterations with positive verification results during step 630, the method 600 reaches the last packet $F_n$, and if this last packet $F_n$ is also verified in a positive manner during step 630 which relates to it, the method 600 continues through a second second-level verification (step 637), pertaining to some, or indeed all, of the packets $F_i$ received by the second verification sub-module V2, in a manner similar to what is described in FIGS. 4A and 4B.

Just as for the second-level verification described in FIGS. 4A and 4B, this second verification can consist in seeking a specific carriage return character, verifying membership in a certain file type, or indeed verifying the signature of the file, etc.

If the result of this second verification is positive (step 638), that is to say if the set of verified packets is validated during the verification step 637, then the secure transfer method 600 continues through the transfer (step 640) of the digital file F to the second file management module G2, either in the form of the digital file F itself (reconstructed, for example by concatenation, on the basis of the n packets $F_i$ in the second verification sub-module), or in the form of packets $F_i$, in which case the digital file F is reconstructed, for example by concatenation, in the second file management module G2.

In these two typical cases, the digital file F is fully recovered in the second file management sub-module G2 where it is read-available (step 650) for the second computerized system.

Conversely, if the result of this second verification is negative (step 638), that is to say if the set of verified packets is not validated during the verification step 637, two options are then possible, in a manner similar to the options described respectively in FIGS. 4A and 4B:

either the secure transfer method 600 is interrupted at this juncture (step 632) and the digital file F does not become accessible to the second computerized system since none of its data packets $F_i$ is transferred to the second file management module G2;

or the set of verified packets is replaced with substitution data (step 639), as described previously with regard to step 537 of FIG. 4B, before being transmitted (step 640) to the second file management module G2 of the secure transfer device DISP'.

Of course, the invention is not limited to the exemplary embodiments described and represented hereinabove, on the basis of which it will be possible to envisage other modes and forms of embodiment, without however departing from the scope of the invention.

In particular, illustrative embodiments describing either an individual, first-level verification on packets only, or a broader, second-level verification on sets of packets or on the whole of the digital file, or the combination of these two types of verifications, have been described previously.

However, the invention is not limited to these illustrative embodiments alone and also covers any combination of various verification levels.

It is thus very possible to contemplate a device having three verification sub-modules so as to perform the verification respectively on three distinct levels:

a first level where the data packets $F_i$ are verified sequentially and individually, similarly to what is described in FIGS. 3A and 3B;

a second intermediate level where sets of data packets $F_i$ corresponding to lines of the digital file F are bundled so as to perform a line-wise verification, according to the principle described in FIGS. 4A and 4B;

a third global level, finally, where the whole of the digital file F is reconstructed on the basis of the data packets $F_i$ and verified in a global manner, for example by means of the verification of a signature applied to the digital file.

The invention claimed is:

1. A method of secure transfer of a digital file originating from a first computerized system to at least one second computerized system, comprising:

writing the digital file on a first file management module of a secure transfer device, wherein the secure transfer device comprises a verification module that is internal to the secure transfer device, the verification module comprising a first verification sub-module and a second verification sub-module;

formatting the digital file written on the first file management module by dividing the digital file into a plurality of data packets, wherein the data packets are smaller than a maximum size of data packets allowed to be transferred to the verification module;

transferring the digital file to the verification module, including transferring at least one of the plurality of data packets to the first verification sub-module;

verifying at least part of the digital file transferred into the verification module, including:

carrying out individual verification on at least one data packet transferred to the first verification sub-module transferring the individually verified data packet to the second verification sub-module; and carrying out a global verification on the individually verified data packet transferred to the second verification sub-module; and transferring the at least partially verified digital file to a second file management module of the secure transfer device as a function of the result of said individual verification.

2. The method of claim 1, in which all the individually verified data packets are transferred to the second verification sub-module, wherein the second verification is an intermediate verification pertaining to a plurality of data packets from among the data packets transferred into the second verification sub-module.

3. The method of claim 1, in which all the individually verified data packets are transferred to the second verification sub-module, wherein the second verification is a global verification pertaining to all the data packets transferred into the second verification sub-module.

4. The method of claim 1, wherein, if the result of the individual verification of one of said packets received by the first verification sub-module and/or of the second verification is negative, the transfer of the data packets is interrupted.

5. The method of claim 1, wherein, if the result of the individual verification of one of said packets received by the first verification sub-module is negative, the data packet whose verification gives a negative result is replaced with a substitution data packet.

6. A device for secure transfer of data able to be connected to a first computerized system and a second computerized system, comprising:

a first file management module configured to store a digital file received from the first computerized system and to divide the digital file into a plurality of data packets that are smaller than a maximum size permitted to be transferred to a physical interface;

a verification module comprising a first verification sub-module and a second verification sub-module, a second file management module configured to receive the digital file from the verification module;

wherein the verification module is configured to receive the digital file stored on the first file management module and to perform a verification on at least part of the digital file received including at least one of said data packets, wherein the first file management module is connected to the verification module by way of the physical interface, wherein the first verification sub-module is configured to:

receive at least one of the data packets;

perform an individual verification pertaining to each of the data packets received; and transmit at least one individually verified data packet to the second file management module as a function of the result of the individual verification, wherein the second file management module is configured to reconstruct the digital file based on the individually verified data packets received from the first verification sub-module, wherein the second verification sub-module is configured to receive at least one individually verified data packet from the first verification sub-module and perform a global verification pertaining to the individually verified data packet.

7. The device of claim 6, in which the second verification sub-module is configured to receive all the data packets verified individually in the first verification sub-module, wherein the second verification is an intermediate verification pertaining to a plurality of packets from among the data packets received from the first verification sub-module.

8. The device of claim 6, in which the second verification sub-module is configured to receive all the data packets verified individually in the first verification sub-module, wherein the second verification is a global verification pertaining to all the data packets received from the first verification sub-module.

* * * * *